United States Patent
Harris et al.

(10) Patent No.: US 6,813,477 B1
(45) Date of Patent: Nov. 2, 2004

(54) SPURIOUS-RESPONSE INTERFERENCE TESTER

(75) Inventors: Eldridge E. Harris, Stone Mountain, GA (US); Pieter C. Seidel, Dacula, GA (US); Randall L. Grunwell, Suwanee, GA (US)

(73) Assignee: Matsushita Mobile Communication Development Corporation, Suwanee, GA (US)

( * ) Notice: Subject to any disclaimer, the term of this patent is extended or adjusted under 35 U.S.C. 154(b) by 618 days.

(21) Appl. No.: 09/789,779

(22) Filed: Feb. 20, 2001

Related U.S. Application Data

(60) Provisional application No. 60/263,649, filed on Jan. 23, 2001.

(51) Int. Cl.[7] .............................................. H04B 17/00
(52) U.S. Cl. ................. 455/67.14; 455/423; 455/424; 455/425; 455/115.2; 455/226.4
(58) Field of Search ................. 455/423, 424, 455/425, 67.11, 67.13, 67.14, 67.7, 63.1, 115.1, 115.2, 155.1, 226.1, 226.4; 379/1.01, 27.03, 29.1

(56) References Cited

U.S. PATENT DOCUMENTS

| | | | | |
|---|---|---|---|---|
| 4,625,332 A | * | 11/1986 | Singer et al. | 455/67.14 |
| 5,548,820 A | * | 8/1996 | Victorin | 455/67.14 |
| 5,898,905 A | * | 4/1999 | Aldridge et al. | 455/67.14 |
| 5,924,029 A | * | 7/1999 | Sohngen et al. | 455/423 |
| 5,930,707 A | * | 7/1999 | Vambaris et al. | 455/424 |
| 5,943,617 A | * | 8/1999 | Nakamura | 455/423 |
| 5,987,320 A | * | 11/1999 | Bobick | 455/423 |
| 6,108,525 A | * | 8/2000 | Takemura | 455/67.14 |
| 6,219,543 B1 | * | 4/2001 | Myers et al. | 455/423 |
| 6,374,084 B1 | * | 4/2002 | Fok | 455/67.14 |
| 6,668,160 B2 | * | 12/2003 | Schmitt et al. | 455/67.14 |
| 6,690,921 B1 | * | 2/2004 | Nagayama et al. | 455/67.14 |

FOREIGN PATENT DOCUMENTS

| | | | | |
|---|---|---|---|---|
| GB | 2250162 | * | 5/1992 | H04B/3/04 |

* cited by examiner

*Primary Examiner*—Lee Nguyen
*Assistant Examiner*—Tuan Tran
(74) *Attorney, Agent, or Firm*—Needle & Rosenberg, PC

(57) ABSTRACT

A system for testing protection against spurious response interference in a radio receiver by imposing wide band interference signals. An interference generator (210) produces a wideband interference signal (220). This interference signal (220) is combined with a test signal (215) generated by a channel generator (205). This combined signal is received by the unit under test (235). The unit under test (235) is insensitive to the interference signal (220) and receives the result signal (240). The result signal (240) is compared to the test signal (215) to check for reception errors. If errors are detected, the wideband interference signal (220) is subdivided and retested in an iterative manner until the band is small enough to perform single frequency tests to locate the frequency causing the error.

46 Claims, 6 Drawing Sheets

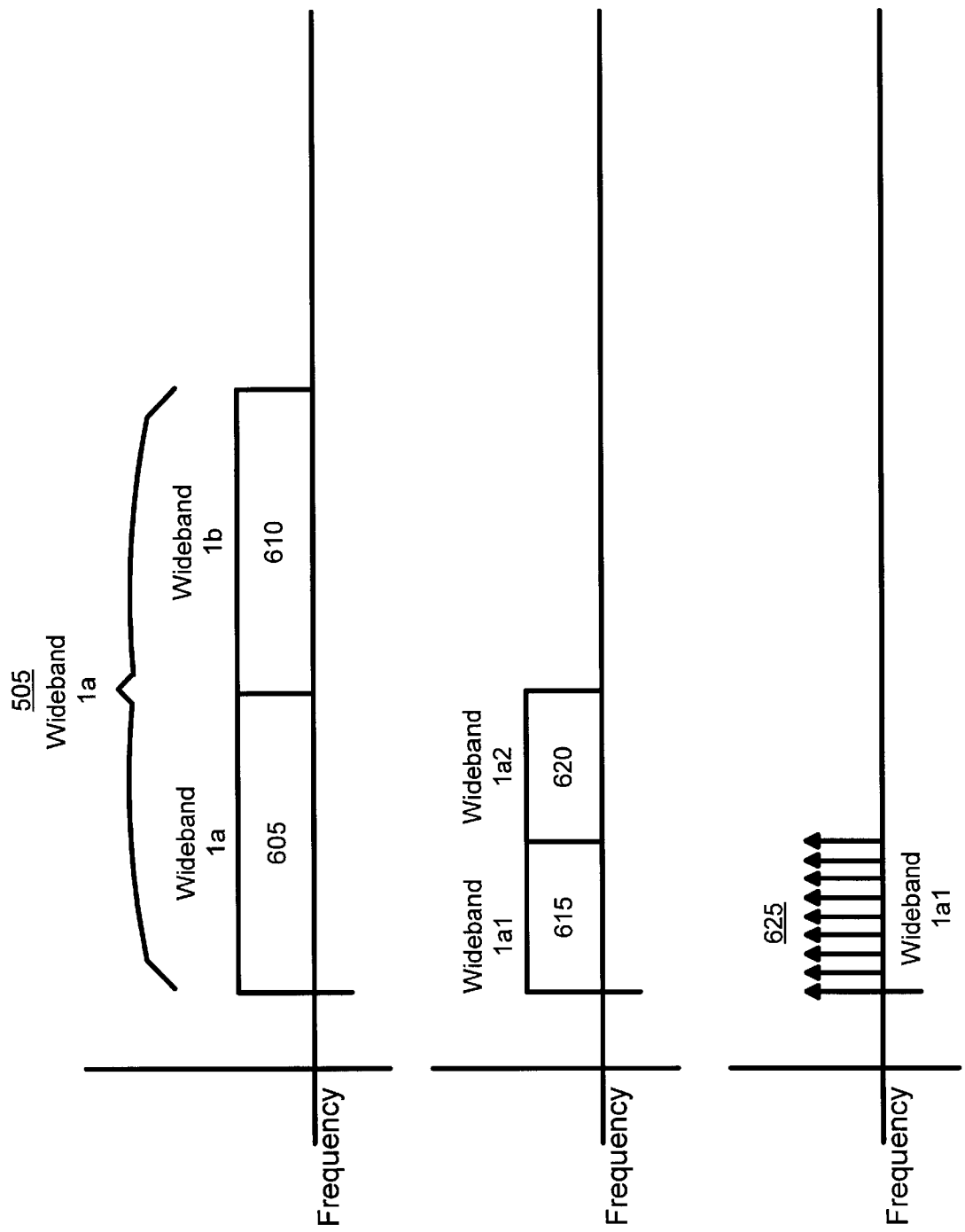

SPURIOUS-RESPONSE INTERFERENCE TESTER

This application claims priority from U.S. provisional patent application Ser. No. 60/263,649, filed on Jan. 23, 2001, entitled SPURIOUS-RESPONSE INTERFERENCE TESTER.

TECHNICAL FIELD

This invention relates generally to the testing of radio devices, and more specifically, to a spurious-response interference tester and method for efficiently testing the device for sensitivity to unwanted radio frequency signals.

BACKGROUND OF THE INVENTION

In compliance with industry specifications, cellular receivers must conform to TIA/EIA standards. These standards require that cellular receivers be insensitive to unwanted radio frequency ("RF") signals. For TDMA/AMPS dual mode cellular telephones, sections 2.3.1.4 and 2.3.2.4 of TIA/EIA-136-270-A set forth the tests required for the digital and AMPS modes of operation. In general, these tests require that the sensitivity of the receiver be monitored while an interfering signal is added. Each channel in each mode is required to be tested from the lowest RF frequency of the radio to at least 2.6 GHz in the 800 MHz bands and 6.0 GHz in the 1900 MHz bands. For a dual-band dual-mode radio, with an interferer stepping at 30 kHz, that translates to over 86,000 frequencies for each of the 832 channels for AMPS, the same number more for 800 digital, and nearly 200,000 frequencies for each of the 1998 PCS channels. This requires over 540,000,000 total tests, and, since it is based on a 30 kHz step, still does not fully comply with the TIA/EIA specification. The specification requires that every frequency be tested.

The TIA/EIA standard requires so many tests that full compliance with the standard is unreasonable and most manufacturers will not comply with the requirements. Thus, there is a need in the art for a system and method to meet the testing requirements set forth in TIA/EIA-136-270-A in a commercially reasonable manner.

One technique that has been used is to apply multiple interfering frequencies to reduce test time. While this method reduces test time, it also increases the chance of erroneously finding a failure.

Therefore, it is evident that there is a need in the art for a system and a method for testing spurious-response interference of radio devices efficiently, quickly, and accurately.

Therefore, it is also evident that there is a need in the art for a system and method for performing a test that conforms to the TIA/EIA standard and is commercially practical.

SUMMARY OF THE INVENTION

The present invention overcomes the above described problems in the prior art by providing a wideband noise source as the testing frequency in order to test large sections of the range at one time.

These wideband noise sources can be generated in various widths. This enables the total test to be performed with a lower number of iterations. If a 20 MHz wideband noise source is used, fewer than 130 iterations are needed in AMPS, fewer than 130 iterations are needed for 800 MHz digital, and fewer than 300 iterations are needed for PCS. This means that about 815,000 total tests are required.

When a test is run over a wide frequency band, the system is susceptible to errors caused by any single frequency in the band. When a failure is indicated within the band, the band is subdivided repeatedly to determine the actual frequency or frequencies causing the failure. This is done by dividing the band in half and testing each half. If an error is found in testing one of the halves, that section is further divided in half and tested again. This procedure is repeated until the band to be tested is small. When only a small band of frequencies remains, individual frequencies in the band are tested to determine the exact frequency or frequencies causing the problem. This method enables the tester to quickly eliminate large frequency bands that are immune to spurious-response interference and efficiently locate the exact frequencies at which errors occur.

Other objects, features and advantages of the present invention will become apparent upon reading the following detailed description of the embodiments of the invention, when taken in conjunction with the accompanying drawings and appended claims.

BRIEF DESCRIPTION OF THE DRAWINGS

FIG. 6 is a frequency diagram illustrating the incremental testing ranges.

DETAILED DESCRIPTION

Figure 1:
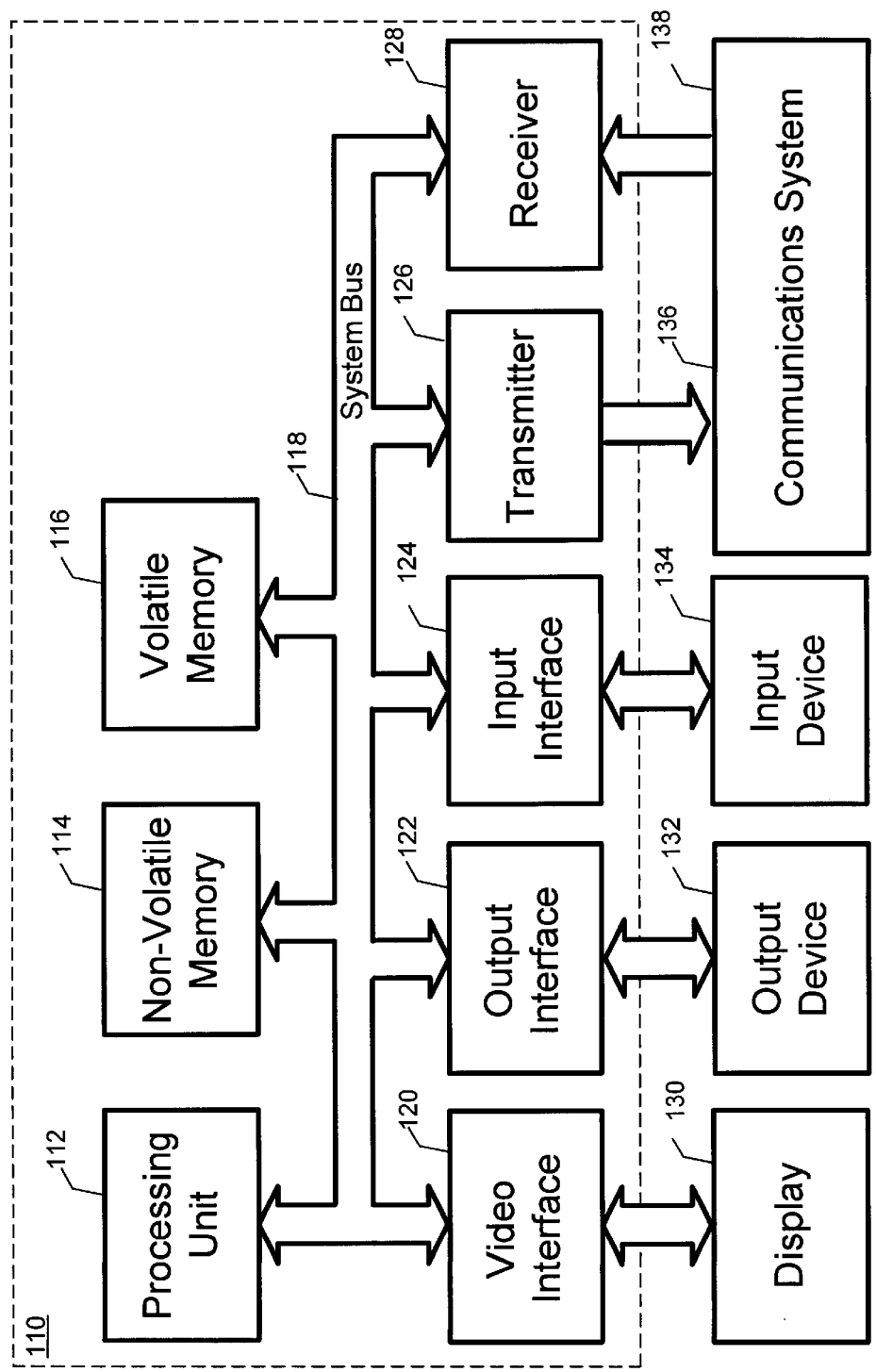
FIG. 1 is a system diagram that illustrates an exemplary environment suitable for implementing various embodiments of the present invention.

Referring now to the drawings, in which like numerals refer to like parts throughout the several views, exemplary embodiments of the present invention are described. Throughout the detailed description, reference will be made to the operation of the present invention when embodied within a cellular telephone; however, it should be understood that the present invention may also be utilized in other radio frequency transmitting/receiving devices including, but not limited to, trunked radios, cordless telephones, and licensed HAM radios.

FIG. 1 is a system diagram that illustrates an exemplary environment suitable for implementing various embodiments of the present invention. FIG. 1 and the following discussion provide a general overview of a platform onto which the invention may be integrated or implemented. Although in the context of the exemplary environment the invention will be described as consisting of instructions within a software program being executed by a processing unit, those skilled in the art will understand that portions of the invention, or the entire invention itself may also be implemented by using hardware components, state machines, or a combination of any of these techniques. In addition, a software program implementing an embodiment of the invention may run as a stand-alone program or as a software module, routine, or function call, operating in conjunction with an operating system, another program, system call, interrupt routine, library routine, or the like. The term program module will be used to refer to software programs, routines, functions, macros, data, data structures, or any set of machine readable instructions or object code, or software instructions that can be compiled into such, and executed by a processing unit.

Those skilled in the art will appreciate that the system illustrated in FIG. 1 may take on many forms and may be directed towards performing a variety of functions. Generally, the system illustrated in FIG. 1 may be any system that includes a radio receiver. Examples of such forms and functions include, but are not limited to, cellular telephones, radio telephones, portable telephones, two-way pagers, personal computers, hand-held devices such a personal data assistants and calculators, consumer electronics, note-book computers, lap-top computers, FM radios, televisions, satellite receivers, automatic garage door openers and a variety of other applications, each of which may serve as an exemplary environment for embodiments of the present invention.

The exemplary system illustrated in FIG. 1 includes a computing device 110 that is made up of various components including, but not limited to a processing unit 112, non-volatile memory 114, volatile memory 116, and a system bus 118 that couples the non-volatile memory 114 and volatile memory 116 to the processing unit 112. The non-volatile memory 114 may include a variety of memory types including, but not limited to, read only memory (ROM), electronically erasable read only memory (EEROM), electronically erasable and programmable read only memory (EEPROM), electronically programmable read only memory (EPROM), electronically alterable read only memory (EAROM), FLASH memory, bubble memory, and battery backed random access memory (RAM). The non-volatile memory 114 provides storage for power on and reset routines (bootstrap routines) that are invoked upon applying power or resetting the computing device 110. In some configurations the non-volatile memory 114 provides the basic input/output system (BIOS) routines that are utilized to perform the transfer of information between elements within the various components of the computing device 110.

The volatile memory 116 may include, but is not limited to, a variety of memory types and devices including, but not limited to, random access memory (RAM), dynamic random access memory (DRAM), FLASH memory, EEPROM, bubble memory, registers, or the like. The volatile memory 116 provides temporary storage for routines, modules, functions, macros, data etc. that are being or may be executed by, or are being accessed or modified by the processing unit 112. In general, the distinction between non-volatile memory 114 and volatile memory 116 is that when power is removed from the computing device 110 and then reapplied, the contents of the non-volatile memory 114 remain in tact, whereas the contents of the volatile memory 116 are lost, corrupted, or erased.

The computing device 110 may access one or more external display devices 130 such as a CRT monitor, LCD panel, LED panel, electro-luminescent panel, or other display device, for the purpose of providing information or computing results to a user. In some embodiments, the external display device 130 may actually be incorporated into the product itself. The processing unit 112 interfaces to each display device 130 through a video interface 120 coupled to the processing unit 110 over the system bus 118.

The computing device 110 may send output information, in addition to the display 130, to one or more output devices 132 such as a speaker, modem, printer, plotter, facsimile machine, RF or infrared transmitter, computer or any other of a variety of devices that can be controlled by the computing device 110. The processing unit 112 interfaces to each output device 132 through an output interface 122 coupled to the processing unit 112 over the system bus 118. The output interface may include one or more of a variety of interfaces, including but not limited to, an RS-232 serial port interface or other serial port interface, a parallel port interface, a universal serial bus (USB), a general purpose interface bus (GPIB), an optical interface such as infrared or IRDA, an RF or wireless interface such as Bluetooth, or other interface.

The computing device 110 may receive input or commands from one or more input devices 134 such as a keyboard, pointing device, mouse, modem, RF or infrared receiver, microphone, joystick, track ball, light pen, game pad, scanner, camera, computer or the like. The processing unit 112 interfaces to each input device 134 through an input interface 124 coupled to the processing unit 112 over the system bus 118. The input interface may include one or more of a variety of interfaces, including but not limited to, an RS-232 serial port interface or other serial port interface, a parallel port interface, a universal serial bus (USB), a general purpose interface bus (GPIB), an optical interface such as infrared or IRDA, an RF or wireless interface such as Bluetooth, or other interface.

It will be appreciated that program modules implementing various embodiments of the present invention may be stored in the non-volatile memory 114, the volatile memory 116, or in a remote memory storage device accessible through the output interface 122 and the input interface 124. The program modules may include an operating system, application programs, other program modules, and program data. The processing unit 112 may access various portions of the program modules in response to the various instructions contained therein, as well as under the direction of events occurring or being received over the input interface 124.

The computing device 110 may transmit signals to, or receive signals from, one or more communications systems 136 such as a cellular network, RF network, computer network, cable network, optical network or the like. The processing unit 112 interfaces to each communications system 136 through a transmitter 126 and a receiver 128, both coupled to the processing unit 112 over the system bus 118. The transmitter 126 and the receiver 128 may include one or more of a variety of transmission techniques such as a radio frequency interface (AM, FM, FSK, PSK, QPSK, TDMA, CDMA, Bluetooth or other technique) or an optical interface such as infrared or IRDA.

Figure 2:
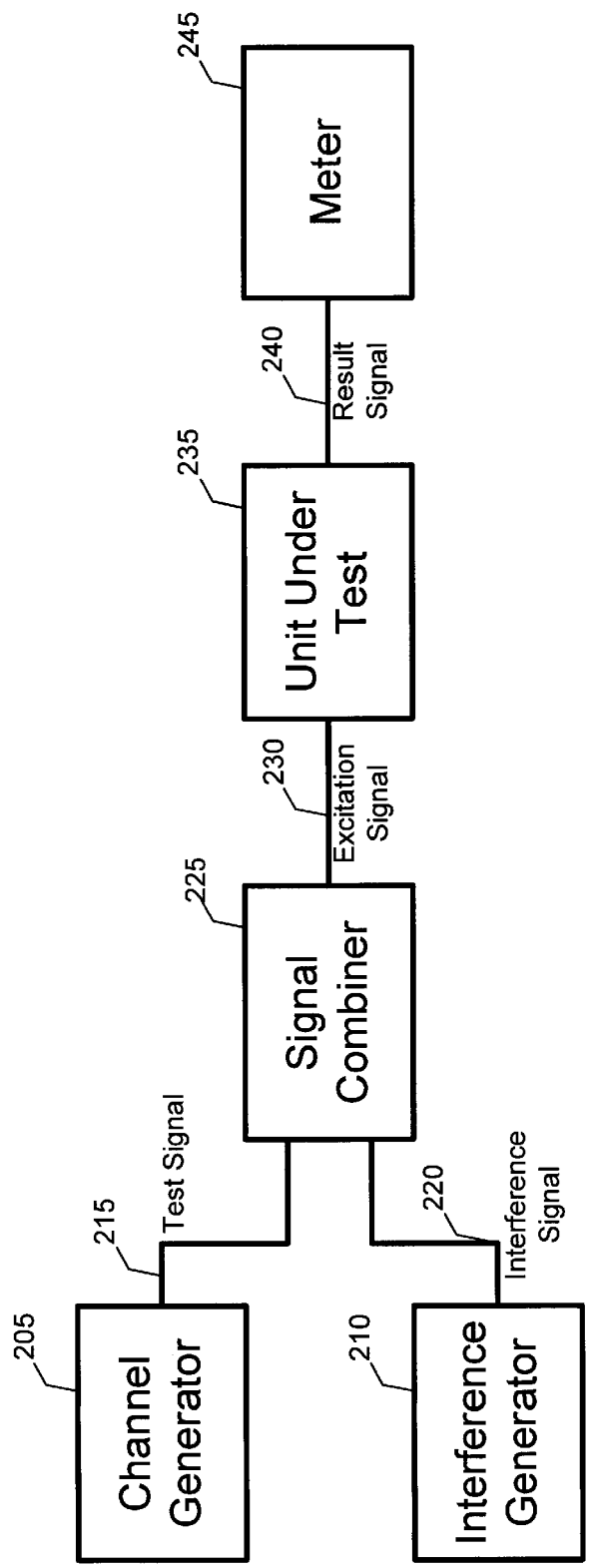
FIG. 2 is a block diagram of an Analog testing system.

FIG. 2 is a block diagram of an Analog testing system. The testing system utilizes a channel generator 205, an interference generator 210, a signal combiner 225 and a meter 245 to test the operation of a unit under test 235. The channel generator 205 generates a test signal 215 on a particular channel. The test signal 215 can be any of a wide variety of signals. One exemplary test signal is an 800 MHz RF signal. The interference generator 210 can be any of a variety of types but should be able to generate broadband signals. One exemplary embodiment of the present invention uses a Rhode-Schwartz SMIQ06 generator. This generator provides a 6 MHz wide excitation. If a broader excitation band is used, the test could be even more efficient. A variety of wideband generators can be used, but the wider the band used, the fewer the number of tests required. The interference generator 210 produces an interference signal 220. The interference signal 220 generally takes the form of a broadband noise signal. One exemplary embodiment of the present invention uses a signal that is modulated with broadband white noise. The modulation is adjusted to provide the widest possible pulse that can be cleanly generated with the interference generator 210.

The test signal 215 and the interference signal 220 are provided to a signal combiner 225. The signal combiner 225 combines the signals so that one excitation signal 230 is created. The excitation signal 230 is equal to the test signal 215 added to the interference signal 220. In one exemplary embodiment of the present invention, the signal combiner 225 is a hardware device designed to combine signals. In an alternative embodiment, the signal combiner 225 may be implemented by broadcasting the test signal 215 and the interference signal 220 onto a common transmission medium. Common transmission mediums include, but are not limited to, optical fibers, telephone wires, coaxial cables, and air.

The excitation signal 230 is provided to the unit under test 235. In one exemplary embodiment of the present invention, the unit under test 235 is a cellular telephone. The unit under test 235 may be any radio frequency receiving device. The unit under test 235 should receive the signal on a particular channel and be insensitive to all signals outside the intended receiving channel. Thus, the unit under test should be unaffected by the interference signal 220 and any effect of the interference signal on the information contained in the test signal 215. The information remaining in the signal after recovery is the result signal 240 and should be substantially similar to the information in the test signal 215. The operation of the unit under test 235 can be verified by routing the result signal 240 back out of the unit under test 235. The result signal 240 is then provided to a meter to measure the signal. In one exemplary embodiment of the present invention, a SINAD meter is used; however, any meter capable of measuring the information in the received result signal 240 may also be used. A SINAD meter measures the signal plus noise plus distortion to noise plus distortion ratio. The information in the received result signal 240 is then compared to the original information on the test signal 215. If the information contained in these signals is substantially similar, the test was successful. If the information contained in the signals is not substantially similar, further testing is necessary to locate the interference frequency that caused the error.

Figure 3:
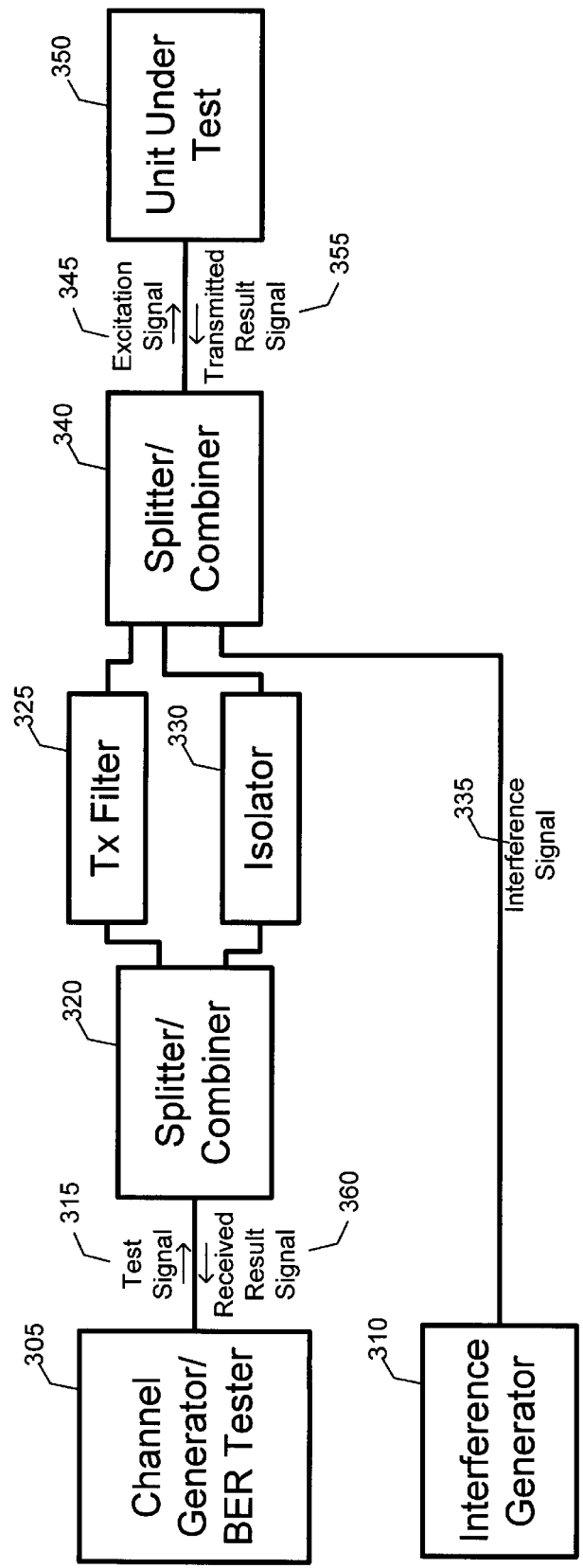
FIG. 3 is block diagram of a Digital testing system.

FIG. 3 is a block diagram of a Digital testing system suitable for hosting an embodiment of the present invention. The digital testing system utilizes a generator/Bit Error Rate ("BER") tester 305, an interference generator 310, a signal splitter/combiner 320, a transmit filter 325, an isolator 330 and a splitter/combiner 340 to verify the operation of a unit under test 350. The channel generator 305 generates a test signal 315 on a particular channel using a representative modulation. The interference generator 310 is a wideband signal generator as described above, and produces an interference signal 335. The interference signal 335 may be, but is not limited to, a noise signal or pseudo-noise signal. The Digital testing system transmits signals across the system in a forward path and a return path.

When transmitting a signal in the forward path, the test signal 315 is provided to the signal splitter/combiner 320. The signal splitter/combiner 320 routes the test signal 315 to the isolator 330. The isolator 330 passes the test signal 315 through the isolator output 330. The output of the isolator 330 is provided to the signal splitter/combiner 340 along with the interference signal 335. The splitter/combiner 340 combines the signals from the isolator 330 and the interference generator 310 to create one excitation signal 345. The excitation signal 345 is equal to the test signal 315 added to the interference signal 335. In one exemplary embodiment of the present invention, the signal combiner 340 is a hardware device designed to combine signals. In an alternative embodiment, this function may be implemented by broadcasting the test signal 315 and the interference signal 335 onto a common transmission medium. Common transmission mediums include, but are not limited to, optical fibers, telephone wires, coaxial cables, and air.

The excitation signal 345 is transmitted to the unit under test 350. In one exemplary embodiment of the present invention, the unit under test 350 is a cellular phone. The unit under test 350 could be any radio frequency receiving device. The unit under test 350 should receive the excitation signal 345 and be insensitive to all signals outside the intended receiving channel to obtain a result signal with the same information on it that was on the test signal 315. Thus, the unit under test 350 should be insensitive to the interference signal 335 and any effect the interference signal had on the information on the test signal 315. The resultant information on the excitation signal 345 should be the information from the test signal 315. This information can be checked by transmitting the resultant information back out of the unit under test 350 on another frequency to the BER tester 305. In an exemplary embodiment this is implemented in the form of an outgoing call from the unit under test 350.

In an exemplary embodiment of the present invention, the transmitted information on the transmitted result signal 355 is transmitted back through the system in a reverse path. The transmitted result signal 355 is transmitted to the splitter/combiner 340. The splitter/combiner 340 routes the transmitted result signal 355 from the unit under test 350 to the transmit filter 325 and to the isolator 330. The isolator 330 blocks the signal and forces it to pass through the transmit filter 325. The transmit filter 325 attenuates everything except the transmitted result signal 355 from the unit under test 350 and transmits the signal to the BER tester 305. The transmit filter 325 blocks all frequencies from the interference signal 335 and the test signal 315 only allowing the transmitted result signal 355 to be transmitted to the BER tester 305.

The received information on the received result signal 360 is compared to the original information on the test signal 315. If this information is substantially similar, the test was successful. If the information on the signals is not substantially similar, further testing is necessary to locate the interference frequency that caused the error.

Figure 4:
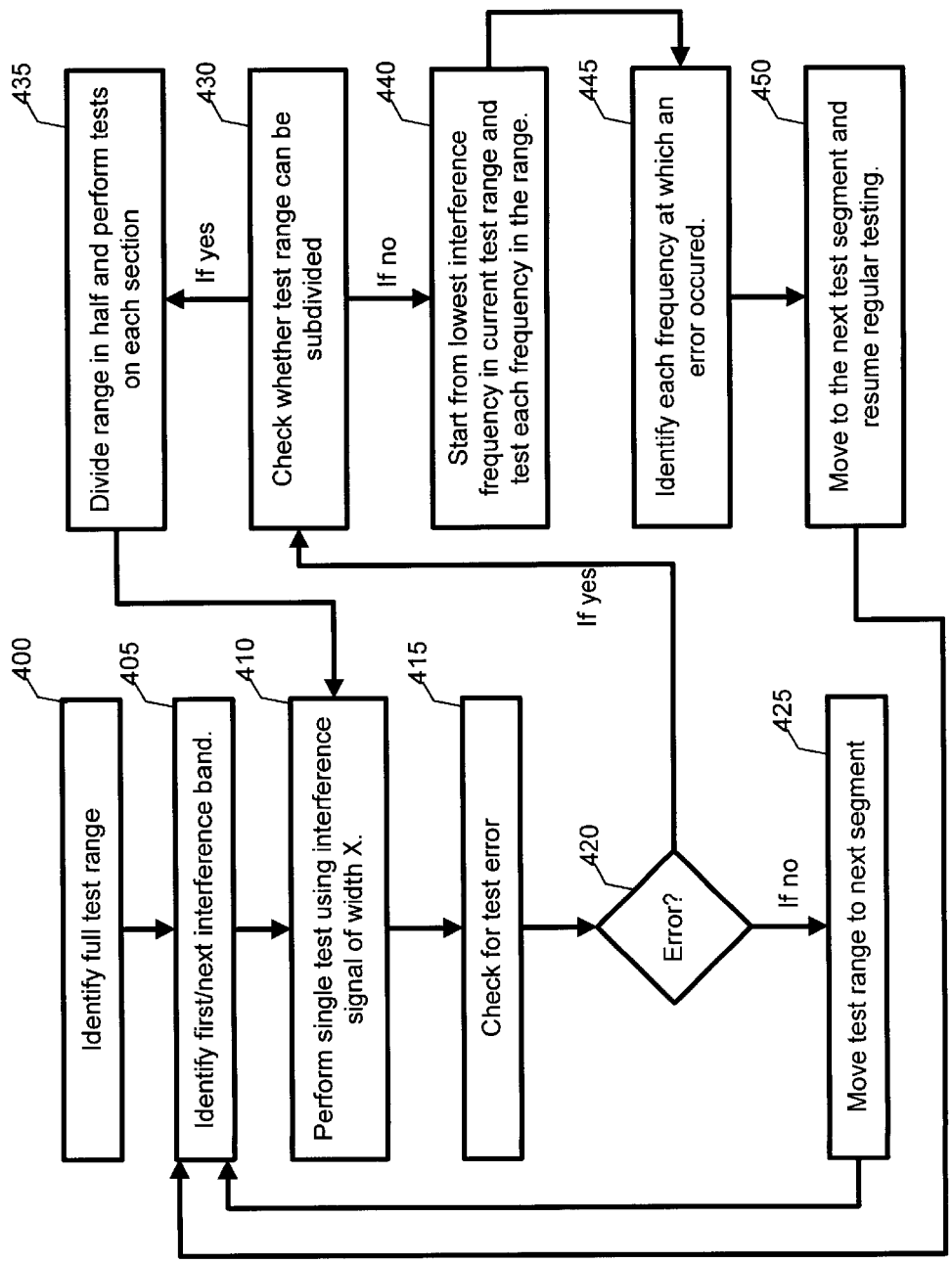
FIG. 4 is a flow diagram illustrating the steps involved in an exemplary embodiment of the test procedure.
Figure 5:
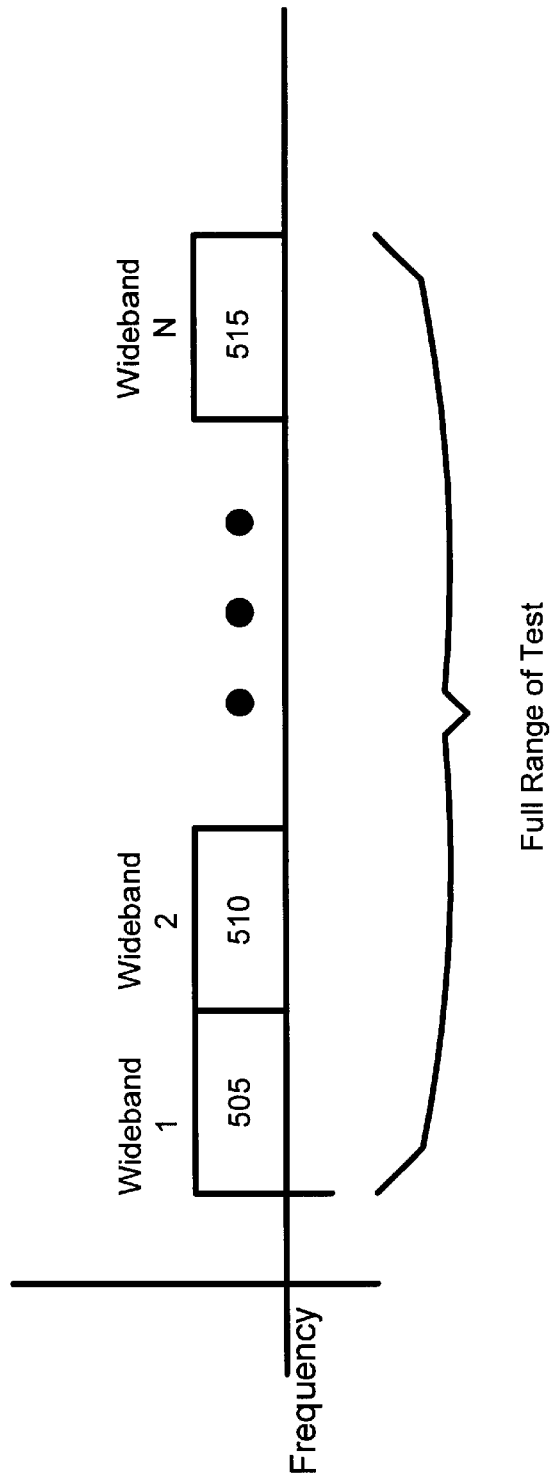
FIG. 5 is a frequency diagram illustrating the wideband test regions.

FIG. 4 is a flow diagram illustrating the steps involved in an exemplary embodiment of the test procedure. The unit under test 350 is tested by exposing it to bands of noise to identify the frequencies that cause errors in the unit. The first step is to identify the full range to be tested 400. The lowest frequency to be tested marks the starting point for the first band. In an exemplary embodiment of the present invention, the range to be tested runs from 10 MHz to 2.6 GHz or 6.0 GHz. Once the full test range is identified, the first interference band to be tested is selected 405. In an exemplary embodiment of the invention, the first band to be tested starts at 10 MHz. The test can be run in any order, but this exemplary embodiment starts with the lowest frequency and proceeds up through the range of frequencies. The first range starts with this lowest frequency and includes the widest band that the interference generator 310 can produce. In the current embodiment, the interference generator 310 can produce a 6 MHz wide signal, therefore the first band is 10 MHz–16 MHz. This selection is depicted in FIG. 5. FIG. 5 is a frequency diagram illustrating the wideband test regions. FIG. 5 shows the full range on which testing will be performed. Wideband 1 505 represents the first band to be tested. If the interference generator 310 does not have sharp transition edges, the bands may need to be adjusted. This can be done by overlapping adjacent bands. In order to implement this procedure for the first band, the band should start at a frequency lower than the first frequency to be tested. In the current example this may be done by setting the first band to 9 MHz–15 MHz. This ensures that the 10 MHz frequency is tested. The amount of overlap needed can be determined by examining the edges of the waveform produced by the interference generator 310.

Once the first band is selected, a single test is run 410. This test can be either the digital test or the analog test. For dual mode devices, both tests may be run. The single tests are described above and are shown in FIG. 2 and FIG. 3.

Upon completion of the test, the system checks the see if an error occurred 415. An error occurs when one or more of the frequencies in the test range cause blocking on the receiver. This occurs when the intended test signal is not received properly due to the interference. If no errors are detected, the next test can be run on the next band of frequencies. The next band is selected by moving the test band to the set of frequencies directly above the preceding test. For an ideal generator, this next range would begin with the last frequency test. For most generators, including the one in an exemplary embodiment of the present invention, an overlap region should be allowed to ensure that all frequencies are tested. This overlap is achieved by starting the next test at a frequency lower than the upper bound of the previous test. This procedure of overlapping frequencies should be understood by one skilled in the art.

If an error occurred 420 in the previous test, the test band is subdivided 435 to locate the frequency or frequencies causing the error. This is done by dividing the band in half and running a single test using these smaller bands as the interference signal 335. This subdivision is shown in FIG. 6 as bands 1a 605 and 1b 610. FIG. 6 is a frequency diagram illustrating the incremental testing ranges. If either of these tests pass without error, then the testing for that subdivided band is complete. If an error is found in one or both of the subdivided bands 605, 610, the band(s) with the error should be subdivided again. This second subdivision is shown in FIG. 6. FIG. 6 shows band 1a subdivided into $1a_1$ 615 and $1a_2$ 620. These bands are tested. This procedure of testing and subdividing is repeated until the subdivided test band is less than a threshold value or limit. This limit is determined by the manufacturer or tester of the device. Once the band reaches the limit, it can be tested by sending single frequencies through the test procedure 440. An exemplary embodiment transitions to single frequency testing when the band reaches a width less than 100 kHz. At this point, the frequencies in the range may be tested with a low number of tests. This method of testing single frequencies is known to those skilled in the art. FIG. 6 shows the small band broken into individual frequencies 625.

After the tests are run on the individual frequencies in the small band, the errors are recorded. These are the actual frequencies at which the un under test 350 has reception errors. Once this single frequency test is complete, the test identifies the next band to be tested 450 and returns to the regular testing procedure 410.

While this invention has been described in detail with particular reference to preferred embodiments thereof, it will be understood that variations and modifications can be effected within the scope of the invention as defined in the appended claims.

What is claimed is:

1. A spurious-response interference test system for a radio frequency device, the radio frequency device operable to receive signals over a transmission medium and being communicatively coupled to a signal meter comprising:

a wideband interference generator for outputting a wideband interference signal into the transmission medium;

a channel generator for outputting a test signal into the transmission medium thereby resulting in a combined signal;

a signal meter operable to compare a result signal to the test signal, the result signal being generated by the radio frequency device in response to processing the combined signal to diminish the effects of the wideband interference signal on the test signal, the signal meter providing an indication of whether the result signal is substantially similar to the test signal.

2. The system of claim 1, wherein the result signal is obtained by the radio device receiving the wideband interference signal and the test signal and being insensitive to the wideband interference signal.

3. The system of claim 1, wherein the radio frequency device is a cellular telephone.

4. The system of claim 1, wherein the wideband interference signal is a single pulse of a square wave.

5. The system of claim 1, wherein the wideband interference signal is a band limited wideband pseudo-noise signal.

6. The system of claim 1, wherein the wideband interference signal is approximately 6 MHz wide.

7. The system of claim 1, wherein the test signal is a 1 kHz audio modulation signal.

8. The system of claim 1, wherein the signal meter is a SINAD meter.

9. A spurious-response interference test system for a radio frequency device comprising:

a wideband interference generator for outputting a wideband interference signal;

a channel generator for outputting a test signal;

a signal combiner coupled to the wideband interference generator and the channel generator for combining the wideband interference signal and the test signal and providing the combined wideband interference and test signal to the radio frequency device; and a signal tester operable to receive a result signal from the radio device, the signal tester providing an indication of whether the result signal is substantially similar to the test signal generated by the channel generator.

10. The system of claim 9, wherein the result signal is obtained by the radio device receiving the test signal and the wideband interference signal and being insensitive to the wideband interference signal.

11. The system of claim 9, wherein the radio frequency device is a cellular telephone.

12. The system of claim 9, wherein the signal tester is a bit error rate tester.

13. The system of claim 9, wherein the wideband interference signal is a band limited wideband pseudo-noise signal.

14. The system of claim 9, wherein the wideband interference signal is approximately 6 MHz wide.

15. The system of claim 9, wherein the test signal is a digital modulation signal.

16. The system of claim 15, wherein the digital modulation signal is a pie/4 Digital Quadrature Phase Shift Keying signal.

17. The system of claim 15, wherein the digital modulation signal is a GSM signal.

18. The system of claim 15, wherein the digital modulation signal is a CDMA signal.

19. The system of claim 15, wherein the digital modulation signal is a signal that operates with heterodyne radio receivers.

20. A method of testing a radio frequency device comprising the steps of:
(a) outputting a test signal;
(b) outputting a wideband interference signal;
(c) combining the test signal with the interference signal;
(d) providing the combined signal to a receiver device;
(e) receiving a result signal from the receiver device;
(f) comparing the result signal to the test signal; and
(g) indicating an error if the result signal and test signal are not substantially similar.

21. The method of claim 20, wherein the test signal is a 1 kHz signal.

22. The method of claim 20, wherein the wideband interference signal is a band limited wideband pseudo-noise signal.

23. The method of claim 20, wherein the wideband interference signal is approximately 6 MHz wide.

24. The method of claim 20, wherein no error was indicated, further comprising:
repeating steps (a) through (g), wherein the wideband interference signal is the next band to be tested.

25. The method of claim 20, wherein an error was indicated, further comprising:
repeating steps (a) through (g), wherein the wideband interference signal is the lower half of the band in which the error was located; and
repeating steps (a) through (g), wherein the wideband interference signal is the upper half of the band in which the error was located.

26. The method of claim 20, wherein an error was indicated and the wideband interference signal is more narrow than a predetermined width, further comprising:
repeating steps (a) through (g) incrementally throughout a band, wherein the wideband interference signal is a single frequency signal; and
recording the frequency of each signal that causes an error.

27. The method of claim 26, wherein the predetermined width is approximately 1 MHz.

28. The method of claim 26, wherein the predetermined width is approximately 100 kHz.

29. The method of claim 26, wherein the increment is approximately 30 kHz.

30. The method of claim 26, wherein the increment is approximately 10 kHz.

31. The method of claim 26, wherein the increment is approximately 1 kHz.

32. A method of testing a radio frequency device comprising the steps of:
outputting a test signal;
outputting a wideband interference signal;
combining the test signal with the interference signal;
receiving the combined signal into a receiving device;
demodulating the combined signal into a result signal;
routing the result signal to a meter;
comparing the result signal to the test signal; and
indicating an error if the result signal and test signal are not substantially similar.

33. The method of claim 32, wherein the meter is a SINAD meter.

34. A method of testing a radio frequency device comprising the steps of:
outputting a test signal;
outputting a wideband interference signal;
combining the test signal with the interference signal;
receiving the combined signal into a receiving device;
demodulating the combined signal into a result signal;
transmitting the result signal to a tester;
comparing the result signal to the test signal; and
indicating an error if the result signal and test signal are not substantially similar.

35. The method of claim 34, wherein the tester is a bit error rate tester.

36. A method of testing a radio frequency device comprising the steps of:
outputting a test signal;
outputting a wideband interference signal;
combining the test signal with the interference signal;
receiving the combined signal into a receiving device;
demodulating the combined signal into a result signal;
routing the result signal to a meter if the radio device is in analog mode or transmitting the signal to a tester if the radio frequency device is in digital mode;
comparing the result signal to the test signal; and
indicating an error if the result signal and test signal are not substantially similar.

37. The method of claim 36, wherein the meter is a SINAD meter.

38. The method of claim 36, wherein the tester is a bit error rate tester.

39. A spurious-response interference test system for a radio frequency device comprising:
a wideband interference generator for outputting a wideband interference signal;
a channel generator for outputting a test signal;
a signal combiner coupled to the wideband interference generator and the channel generator for combining the wideband interference signal and the test signal and providing the combined wideband interference and test signal to the radio frequency device; and
a signal meter operable to receive a result signal from the radio device, the result signal being generated by the readio frequency device in response to processing the combined wideband interference and test signals to diminish the effects of the wideband interference signal on the test signal, the signal meter providing an indication of whether the result signal is substantially similar to the test signal generated by the channel generator.

40. The system of claim 39, wherein the result signal is obtained by the radio device receiving the wideband interference signal and the test signal and being insensitive to the wideband interference signal.

41. The system of claim 39, wherein the radio frequency device is a cellular telephone.

42. The system of claim 39, wherein the wideband interference signal is a single pulse of a square wave.

43. The system of claim 39, wherein the wideband interference signal is a band limited wideband pseudo-noise signal.

44. The system of claim 39, wherein the wideband interference signal is approximately 6 MHz wide.

45. The system of claim 39, wherein the test signal is a 1 kHz audio modulation signal.

46. The system of claim 39, wherein the signal meter is a SINAD meter.

* * * * *